(12) United States Patent
Xu et al.

(10) Patent No.: US 10,956,718 B2
(45) Date of Patent: Mar. 23, 2021

(54) PHOTOGRAPH PERMISSION MANAGEMENT INTEGRATED WITH REAL-TIME FACIAL RECOGNITION

(71) Applicant: INTERNATIONAL BUSINESS MACHINES CORPORATION, Armonk, NY (US)

(72) Inventors: Rui Li Xu, Beijing (CN); Su Liu, Austin, TX (US); Zhai Ya Juan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/184,095

(22) Filed: Nov. 8, 2018

(65) Prior Publication Data

US 2020/0151429 A1    May 14, 2020

(51) Int. Cl.
*G06K 9/00*    (2006.01)
*G06F 21/36*   (2013.01)
*G06F 21/32*   (2013.01)

(52) U.S. Cl.
CPC ......... *G06K 9/00288* (2013.01); *G06F 21/32* (2013.01); *G06F 21/36* (2013.01); *G06K 9/00228* (2013.01)

(58) Field of Classification Search
CPC ........... G06K 9/00288; G06K 9/00677; G06K 2009/00328; G06K 9/00261; G06K 9/00281; G06K 9/00892; G06K 9/00228; G06K 9/00248; G06K 9/00255; G06K 9/00268; G06K 9/00335; G06K 9/00604; G06K 9/00671; G06K 9/00906; G06Q 50/01; G06Q 30/02; G06Q 30/0241; G06Q 20/40145; G06Q 30/0269; G06Q 20/3276; G06Q 30/0277; G06Q 40/02; G06F 16/583; G06F 21/32; G06F 15/16; G06F 16/50; G06F 16/955; G06F 21/10; G06F 21/34;
(Continued)

(56) References Cited

U.S. PATENT DOCUMENTS 8,655,028 B2    2/2014  Hsi
9,077,678 B1    7/2015  Hardman et al.
9,361,626 B2 *  6/2016  Garcia-Barrio ........ G06Q 50/01
(Continued)

FOREIGN PATENT DOCUMENTS

CN    107948281    4/2018
WO    2014019317   2/2014
WO    2014194020   12/2014

OTHER PUBLICATIONS

Kaihe Xu et al., My Privacy My Decision: Control of Photo Sharing on Online Social Networks, IEEE Transactions on Dependable and Secure Computing, Mar. 1-Apr. 2017, pp. 199-210, vol. 14, No. 2.
(Continued)

*Primary Examiner* — Golam Sorowar
(74) *Attorney, Agent, or Firm* — Tutunjian & Bitetto, P.C.; Kurt Goudy

(57) ABSTRACT

Methods and systems for sharing digital media include locating faces within a digital image. Individuals portrayed in the digital image are identified based on the located faces. The identified individuals are added to an access control list for the digital image to enable the identified individuals to access the digital image.

17 Claims, 7 Drawing Sheets

(58) Field of Classification Search
CPC ...... G06F 21/35; G06F 21/60; G06F 21/6218; G06F 2221/0717
See application file for complete search history.

(56) References Cited

U.S. PATENT DOCUMENTS

| | | | |
|---|---|---|---|
| 9,569,658 B2 | 2/2017 | Johnson et al. | |
| 9,639,740 B2 | 5/2017 | Ganong et al. | |
| 9,773,162 B2 | 9/2017 | Needleman | |
| 9,785,699 B2 | 10/2017 | Gupta et al. | |
| 10,476,827 B2 * | 11/2019 | Lieb | H04L 51/18 |
| 2014/0181948 A1 | 6/2014 | Mazur et al. | |
| 2015/0261789 A1 | 9/2015 | Wong | |
| 2015/0381614 A1 * | 12/2015 | Hildreth | G06F 21/32 726/7 |
| 2016/0063235 A1 * | 3/2016 | Tussy | H04W 12/06 726/6 |
| 2016/0292494 A1 * | 10/2016 | Ganong | G06K 9/00288 |

OTHER PUBLICATIONS

Jignesh Padhiyar et al., Apple Simplifies Photo-sharing with Facial Recognition Technology, https://www.igeeksblog.com/apple-simplifies-photo-sharing-with-facial-recognition-technology-13082015, accessed Aug. 17, 2018.

* cited by examiner

PHOTOGRAPH PERMISSION MANAGEMENT INTEGRATED WITH REAL-TIME FACIAL RECOGNITION

BACKGROUND

Technical Field

The present invention generally relates to digital photograph management and, more particularly, to the sharing of photographs with users based on facial recognition.

Description of the Related Art

The miniaturization of digital cameras and their integration with mobile computing devices has led to a dramatic increase in the number of pictures that people take. Management platforms for these pictures have made it simple for users to share their photographs with friends, family, and the world. However, with the increase in the number of photographs being taken and shared comes an increased burden in managing the photographs. Setting the people who have permission to view each photograph can be a painstaking task.

SUMMARY

A method for sharing digital media includes locating faces within a digital image. Individuals portrayed in the digital image are identified based on the located faces. The identified individuals are added to an access control list for the digital image to enable the identified individuals to access the digital image.

A system for sharing digital media includes a face detection module configured to locate faces within a digital image. A face matching module is configured to identify individuals portrayed in the digital image based on the located faces. A photo manager module is configured to add the identified individuals to an access control list for the digital image to enable the identified individuals to access the digital image.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention use facial recognition technology to automatically identify people in a digital image. This identification is used to set permissions as to who is permitted to access the digital image. During subsequent accesses of the digital image by such users, the facial recognition technology is again used to authenticate the user's access, comparing their face to the face that is portrayed in the digital image. These embodiments can be implemented in a cloud photo management system, in a social network, or in any other appropriate context.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
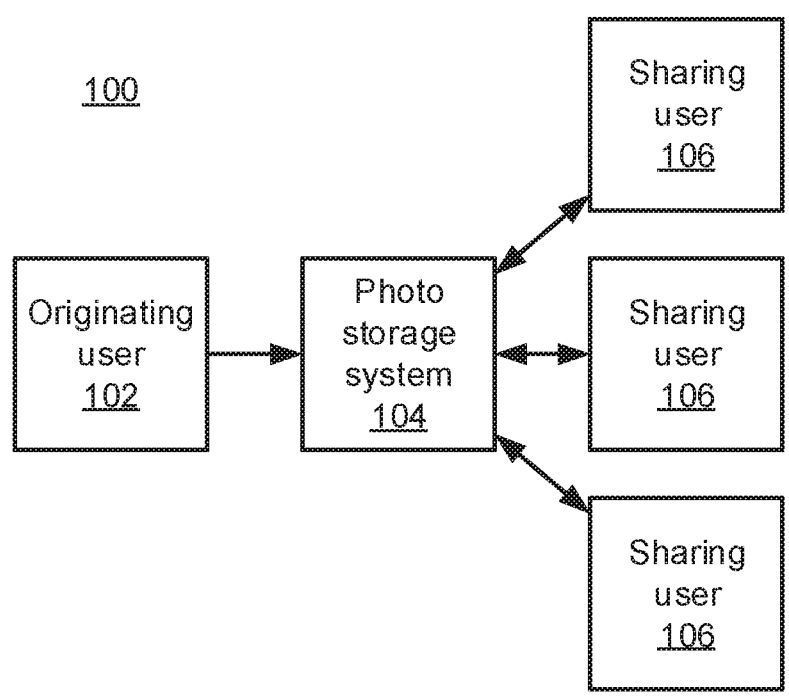
FIG. 1 is a block diagram of a photo storage system that uses facial recognition to provide automatic permissions control and authentication in accordance with an embodiment of the present invention.

Referring now to FIG. 1, a photo sharing network 100 is shown. An originating user 102 stores a digital image on a photo storage system 104. The digital image may be generated by any appropriate mechanism including, for example, a camera built into a mobile computing device, a scanner, or any other system for capturing visual information. The photo storage system 104 is configured to store the digital image for the originating user 102 and to make the digital image available to one or more sharing users 106, as indicated by the originating user 102.

The photo storage system 104 can be any appropriate centralized or distributed storage system. For example, the photo storage system 104 can be a dedicated photo storage/sharing service or can, alternatively, be a social network or other service that incorporates photo storage functionality. The photo storage system 104 can be implemented on a single device or can, alternatively, be implemented in a cloud computing system.

According to the present embodiments, when the originating user 102 uploads a digital image to the photo storage system 104, the photo storage system 104 performs face recognition on the digital image to identify the faces of one or more people. The photo storage system 104 then identifies the accounts of one or more other users that match the identified faces and automatically designates them as sharing users 106, adding those users to an access control list with permissions to view the digital image.

When the sharing users 106 attempt to access the digital image at the photo storage system 104, the photo storage system 104 attempts to authenticate each sharing user 106. This authentication may be performed by, for example, taking an image or video of the sharing user 106, performing facial recognition on the image or video, and comparing the facial recognition information to the identified faces in the digital image. If there is a match, then the photo storage system 104 authenticates the sharing user 106 and the sharing user 106 is given access to the digital image.

The present embodiments thereby provide a substantial improvement to the process of sharing digital media. By automatically identifying and granting permissions to users that are present in a shared image, the originating user 102 is able to share the image with interested parties in a much more efficient way. Furthermore, the present embodiments decrease the burden on other users to access the digital image by employing facial recognition to perform authentication. The present embodiments thereby streamline the process of sharing images at each stage, both at the original upload and at the subsequent access by authorized users.

Figure 2:
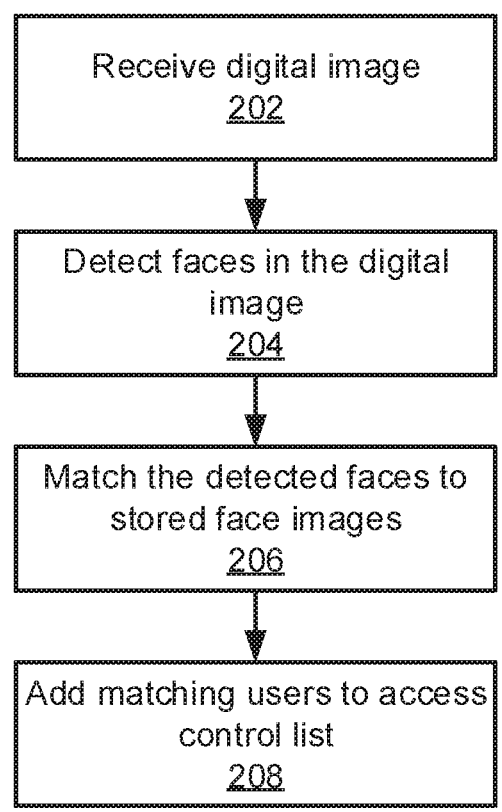
FIG. 2 is a block/flow diagram of a method for using facial recognition to provide automatic permissions control for digital images in accordance with an embodiment of the present invention.

Referring now to FIG. 2, a method of automatically setting access control lists for a digital image is shown. Block 202 receives the digital image from an originating user 102. The digital image can be in any appropriate image format, including for example JPG, GIF, PNG, BMP, TIF, RAW, etc. It should also be understood that, although the present embodiments are described with a particular focus on still images, they are also applicable to video data. Video data may be treated as a sequence of still images or may, alternatively, be analyzed with shared information between stills.

Block 204 detects faces in the digital image. This can be performed with any appropriate face detection/identification method. For example, block 204 may employ a neural network model that is trained on a set of classified training images, where each image is labeled with respect to whether or not it includes a face and the location of the face within the image. This model can then be used as a classifier for future images, identifying the location of any faces within an image.

Block 206 then matches the detected faces to stored face images. This can be performed with any appropriate face matching method. For example, block 206 may employ a classifier that identifies recognizable facial features within a given face image and compares those facial features to the features of the stored face images. If the match has sufficiently high confidence, for example if the classifier generates a confidence value for the match that exceeds a threshold, then block 206 identifies a user associated with the matching stored face image. The stored face images may include, for example, user profile pictures, a user's designated identification image, one or more images from a user's own stored digital images, etc.

Block 208 adds matching users to an access control list for the digital image. The level of access that is given to the matching users can be set according to automatic defaults or may, alternatively, be set by the originating user 102. In some embodiments, the access level can be set according to defaults and then altered by the user before being finalized. Exemplary levels of access that can be assigned to matching users include the ability to view, edit, delete, copy, and tag the digital image.

In some embodiments, the access control list may also maintain a location within the digital image where the identified user's face can be found. This makes it simpler during subsequent authentication to locate the image of the user's face to be matched against an authenticating face image, as will be described in further detail below.

Figure 3:
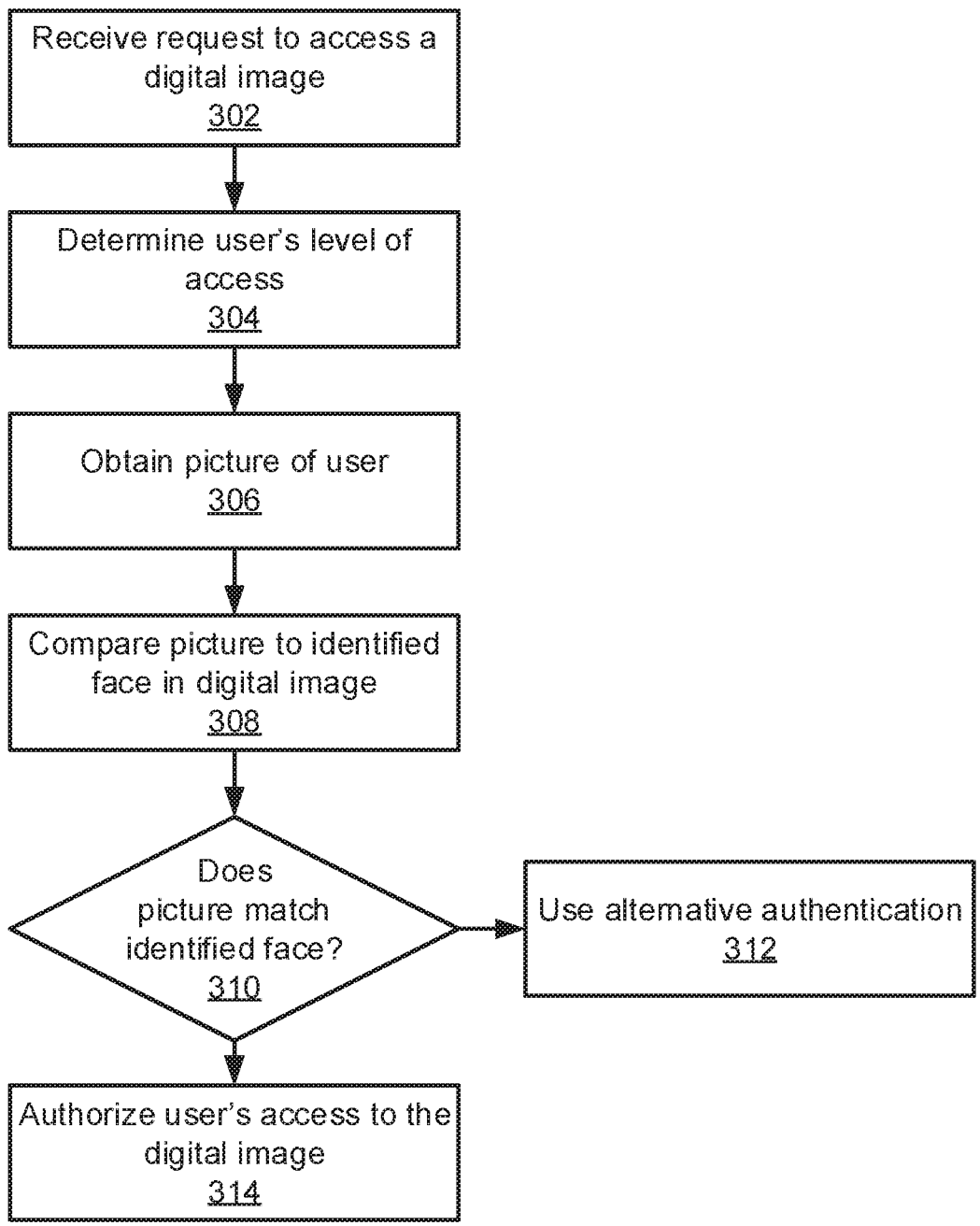
FIG. 3 is a block/flow diagram of a method for using facial recognition to provide authentication for access to digital images in accordance with an embodiment of the present invention.

Referring now to FIG. 3, an authentication process is shown. In block 302, a request to access a digital image is received from, e.g., one of sharing users 106. This request can be at the invitation of the originating user 102, can follow a notification issued by photo storage system 104 upon upload of the digital image and recognition of the sharing user 106 in the digital image, or it can be unprompted. The request includes an identification of the digital image, the identity of the sharing user 106, and a type of action that is requested (e.g., read, edit, etc.).

Block 304 determines whether the sharing user 106 is in an access control list associated with the digital image. As described above, the access control list can be automatically set upon upload of the digital image by locating faces within the digital image and identifying matching users. The access control list can also specify a level of access that provides the sharing user 106 with certain permissions. If the requesting user is not in the access control list, then processing stops and the requesting user is informed that they do not have the appropriate permissions to access the digital image. Similarly, if the requesting user requests an action that is not within the permissions granted to them in the access control list, then processing stops and the requesting user is informed.

Assuming the requesting user is identified as having the appropriate permissions in the access control list to perform the requested action with respect to the digital image, block 306 obtains a picture of the user for authentication purposes. The picture can be obtained in multiple different ways. Block 306 can first try to access a photo from a user's social network public profile, for example, or any other source such as, e.g., a mobile phone address book. If block 306 cannot obtain a face picture from one of these sources, a current photo can be requested, where the sharing user 106 users their mobile device to take a picture of their face for matching against the digital image.

Block 308 compares the obtained face picture of the sharing user 106 to the face identified in the digital image. As noted above, facial comparison can be performed according to any appropriate process by, e.g., scoring the respective faces according to particular facial features or through the use of a neural network. Block 308 determines a level of confidence that the two pictures match. In some embodiments, block 308 can perform the comparison with respect to both the user's profile picture and a live picture, for example if the comparison to the user's profile picture does not generate a sufficiently high confidence.

Block 310 determines whether the obtained picture matches the identified face in the digital image. This can be accomplished by comparing the confidence score to a threshold confidence value. If the confidence score is greater than the threshold value, then block 310 indicates a match. If no match is found, then block 312 uses an alternative authentication method, such as having the sharing user 106 enter a username and password. If a match is found, then block 314 authorizes the user's access to the digital image and performs the requested action.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as readily apparent by one of ordinary skill in this and related arts, for as many items listed.

Figure 4:
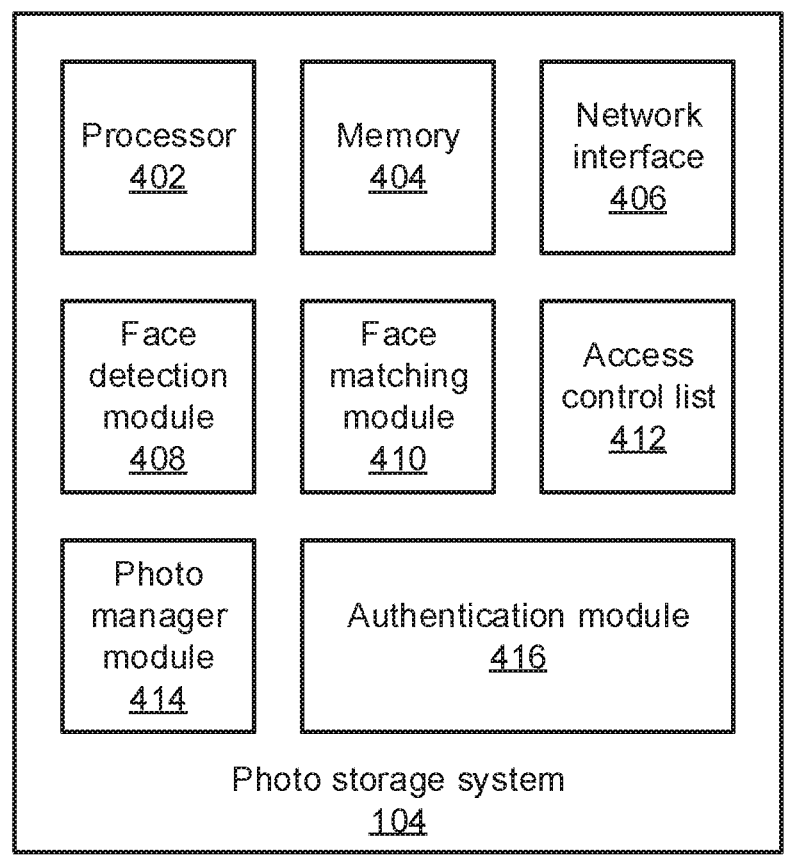
FIG. 4 is a block diagram of a photo storage system that that uses facial recognition to provide automatic permissions control and authentication in accordance with an embodiment of the present invention.

Referring now to FIG. 4, detail on the photo storage system 104 is shown. The photo storage system 104 includes a hardware processor 402 and memory 404, as well as a network interface 406. The network interface 406 communicates with originating users 102 and with sharing users 106 using any appropriate communications medium and protocol. The photo storage system 104 also includes one or more functional modules that may, in some embodiments, be implemented as software that is stored in the memory 404 and that is executed by the hardware processor 402. In other embodiments, one or more functional modules may be implemented as one or more discrete hardware components in the form of, e.g., application-specific integrated chips or field programmable gate arrays.

The photo storage system 400 includes a photo manager module 414 that receives a digital image from an originating user 102 via the network interface 406 and stores the digital image in memory 404. A face detection module 408 is used to locate people's faces within the digital image. A face matching module 410 then compares the located faces to one or more stored faces, for example in a local database or in a publicly available database such as a social network. The face matching module 410 thereby identifies individual people as being in the digital image. The photo manager module 414 uses the list of identified people to update an access control list 412 associated with the digital image, for example by granting access permissions to the identified people. The photo manager module 414 can, in some embodiments, notify the identified people that they have access to the digital image.

The photo manager module 414 also handles access requests by other users 106. When the photo manager module 414 receives an access request from a user via the network interface 406, it first checks the access control list 412 to see whether the user has permission to access the requested digital image. If so, the authentication module 416 obtains a photo of the requesting user to compare to the corresponding face in the digital image. This photo can be obtained by accessing a local or public database of user photos. If there is a match, then authentication module 416 authorizes the user's requested access and the photo manager module 414 performs the requested action. If there is no match, then the authentication module 416 uses an alternative form of authentication, for example by requesting a username and password.

Figure 5:
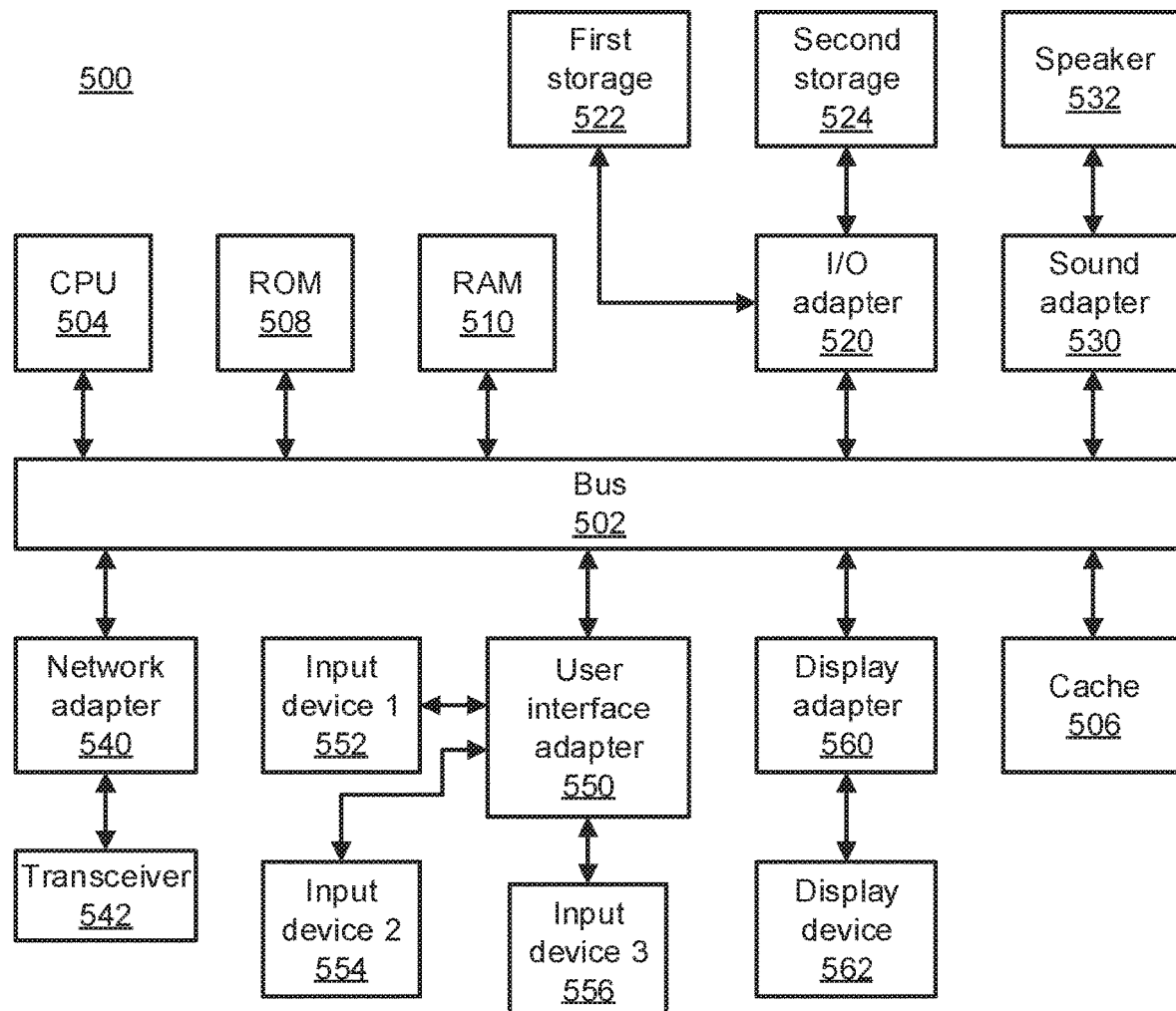
FIG. 5 is a block diagram of a processing system in accordance with an embodiment of the present invention.

Referring now to FIG. 5, an exemplary processing system 500 is shown which may represent the photo storage system 104. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Figure 6:
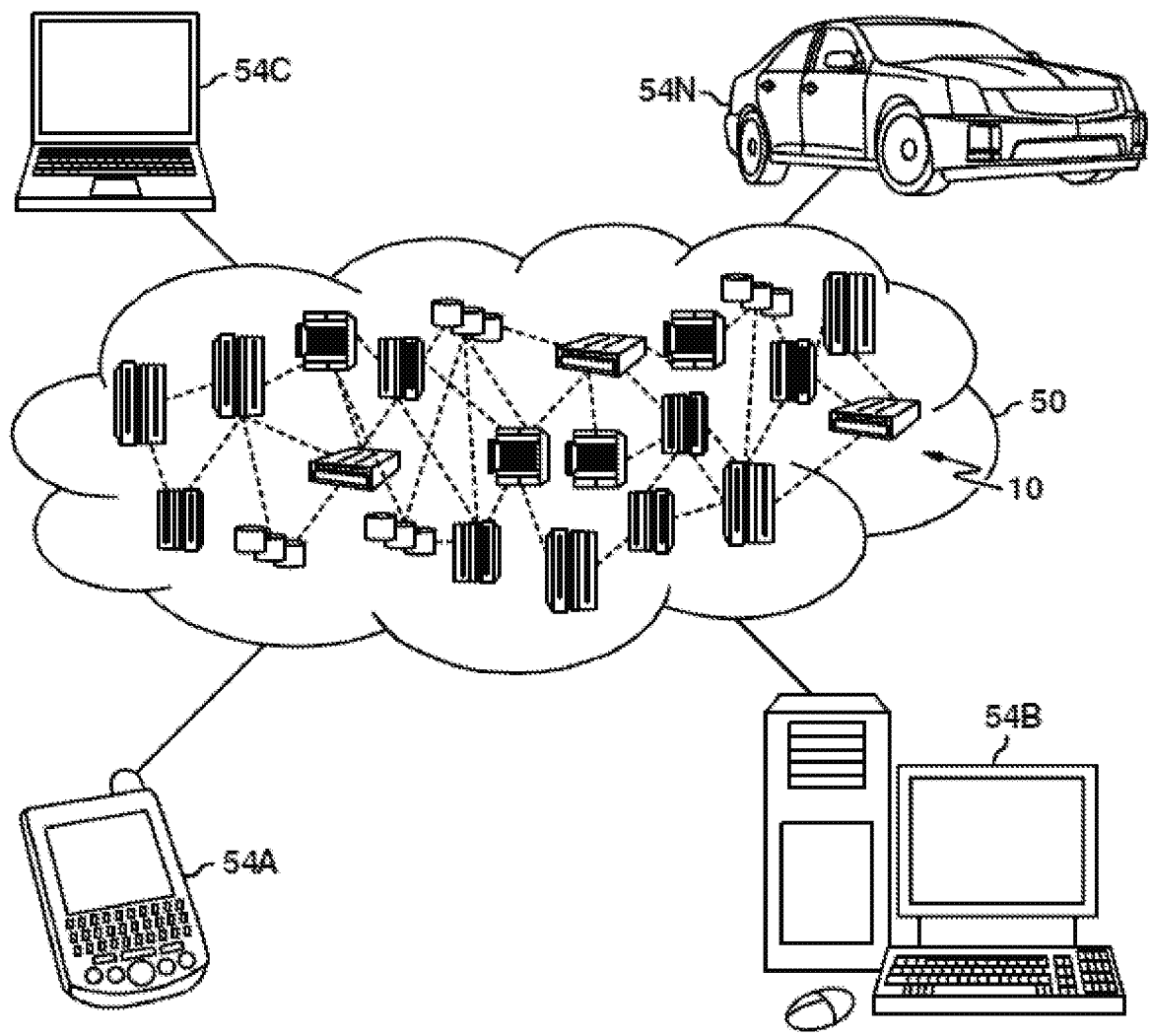
FIG. 6 is a diagram of a cloud computing environment according to the present principles.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
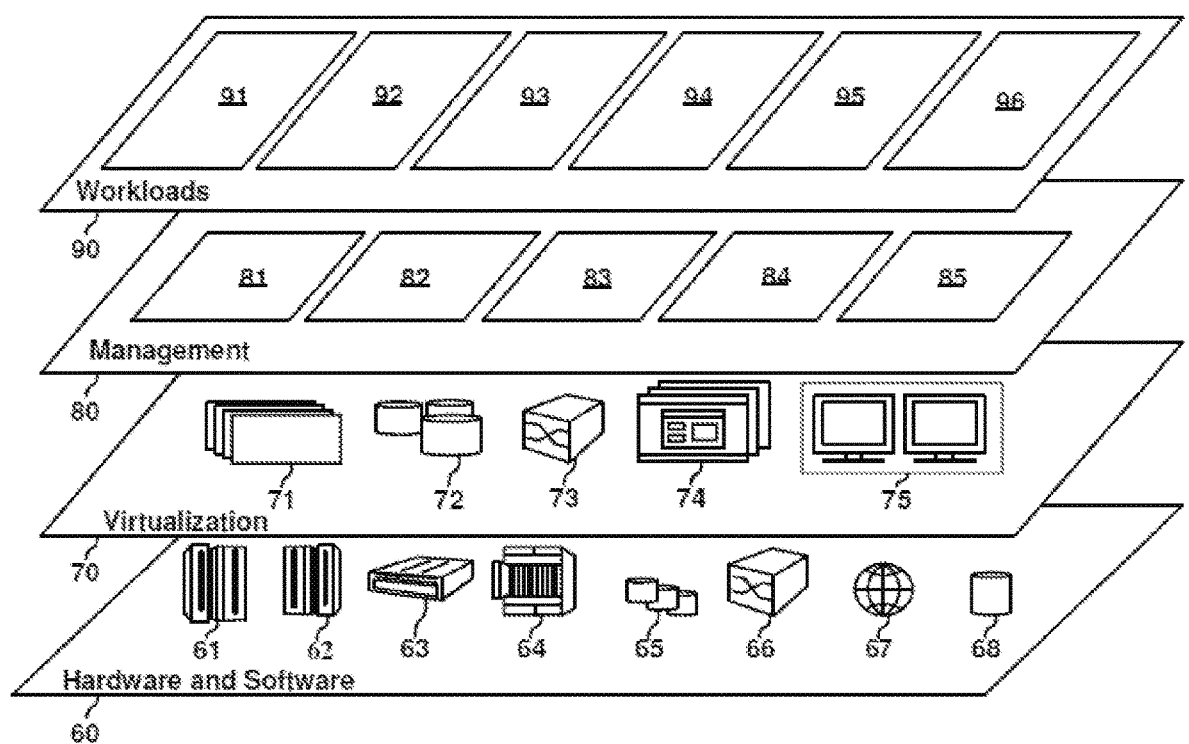
FIG. 7 is a diagram of abstraction model layers according to the present principles.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facial recognition-based photo permission management 96.

Having described preferred embodiments of photograph permission management integrated with real-time facial recognition (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for sharing digital media, comprising:
   locating faces within a digital image;
   identifying individuals portrayed in the digital image based on the located faces;
   adding the identified individuals to an access control list for the digital image to enable the identified individuals to access the digital image, including setting a level of access for the identified individuals for the digital image in the access control list that is selected from the group consisting of an ability to view, edit, delete, copy, and tag;
   authenticating an access request from a requesting user based on a facial match between a facial image of the requesting user and a face of one of the identified individuals in the digital image, after adding the identified individuals to the access control list; and
   granting access to the digital image to the requesting user, in accordance with the level of access of the matched identified individual in the access control list.

2. The computer-implemented method of claim 1, wherein authenticating the access request comprises obtaining a facial image of the requesting user.

3. The computer-implemented method of claim 2, wherein obtaining the facial image of the requesting user comprises accessing a stored facial image associated with a profile of the requesting user.

4. The computer-implemented method of claim 2, wherein obtaining the facial image of the requesting user comprises taking a current picture of the requesting user's face.

5. The computer-implemented method of claim 2, wherein authenticating the access request further comprises comparing the obtained facial image of the requesting user to a face of the requesting user in the digital image.

6. The computer-implemented method of claim 5, wherein authenticating the access request further comprises:
   determining that the facial image of the requesting user does not match the face of the requesting user in the digital image; and
   authenticating the access request with a username and password received from the requesting user.

7. The computer-implemented method of claim 1, wherein authenticating the access request comprises determining that the requesting user is included in the access control list for the digital image.

8. The computer-implemented method of claim 1, wherein adding the identified individuals to the access control list comprises setting access permissions for the identified individuals and storing a location of a face of each identified individual within the digital image.

9. A non-transitory computer readable storage medium comprising a computer readable program for sharing digital media, wherein the computer readable program when executed on a computer causes the computer to perform the steps of:
- locating faces within a digital image;
- identifying individuals portrayed in the digital image based on the located faces; and
- adding the identified individuals to an access control list for the digital image to enable the identified individuals to access the digital image, including setting a level of access for the identified individuals for the digital image in the access control list that is selected from the group consisting of an ability to view, edit, delete, copy, and tag;
- authenticating an access request from a requesting user based on a facial match between a facial image of the requesting user and a face of one of the identified individuals in the digital image, after adding the identified individuals to the access control list; and
- granting access to the digital image to the requesting user, in accordance with the level of access of the matched identified individual in the access control list.

10. A system for sharing digital media, comprising:
- a hardware processor; and
- a memory that stores computer program code which, when executed by the hardware processor, implements:
  - face detection code that locates faces within a digital image;
  - face matching code that identifies individuals portrayed in the digital image based on the located faces;
  - photo manager code that adds the identified individuals to an access control list for the digital image to enable the identified individuals to access the digital image, and sets a level of access for the identified individuals for the digital image in the access control list that is selected from the group consisting of an ability view, edit, delete, copy, and tag; and
  - authentication code that authenticates an access request from a requesting user based on a facial match between a facial image of the requesting user and a face of one of the identified individuals in the digital image, after the identified individuals have been added to the access control list, and that grants access to the digital image to the requesting user, in accordance with the level of access of the matched identified individual in the access control list.

11. The system of claim 10, wherein the authentication code further obtains a facial image of the requesting user.

12. The system of claim 11, wherein the authentication code further accesses a stored facial image associated with a profile of the requesting user.

13. The system of claim 11, wherein the authentication code further requests a current picture of the requesting user's face.

14. The system of claim 11, wherein the face matching code further compares the obtained facial image of the requesting user to a face of the requesting user in the digital image.

15. The system of claim 14, wherein the authentication code further determines that the facial image of the requesting user does not match the face of the requesting user in the digital image and authenticates the access request with a username and password received from the requesting user.

16. The system of claim 10, wherein the authentication code further determines that the requesting user is included in the access control list for the digital image.

17. The system of claim 10, wherein the photo manager code further sets access permissions for the identified individuals and stores a location of a face of each identified individual within the digital image.

* * * * *